Nov. 23, 1954     R. A. WOLFE     2,695,364
PYROMETER
Filed June 22, 1951     3 Sheets-Sheet 1
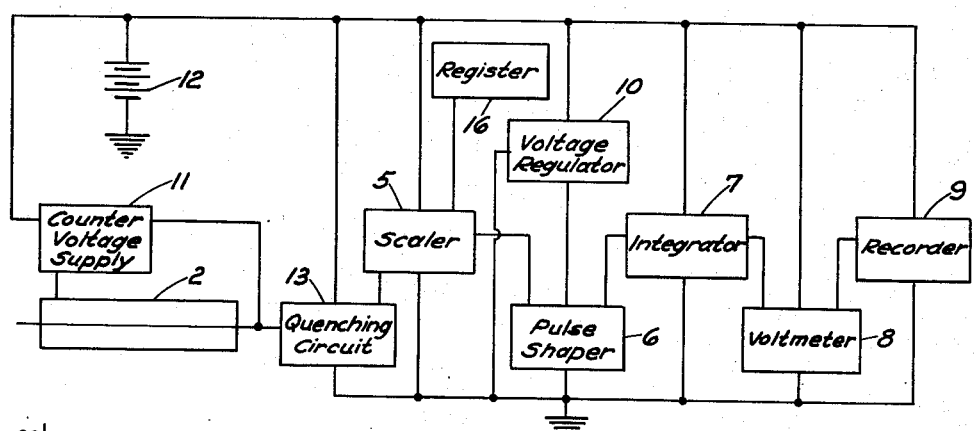
Fig-3-
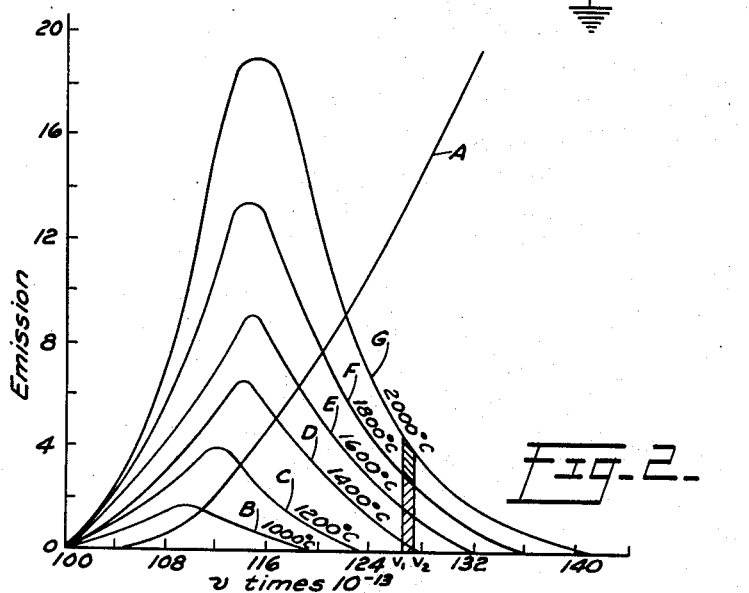
Fig-2-
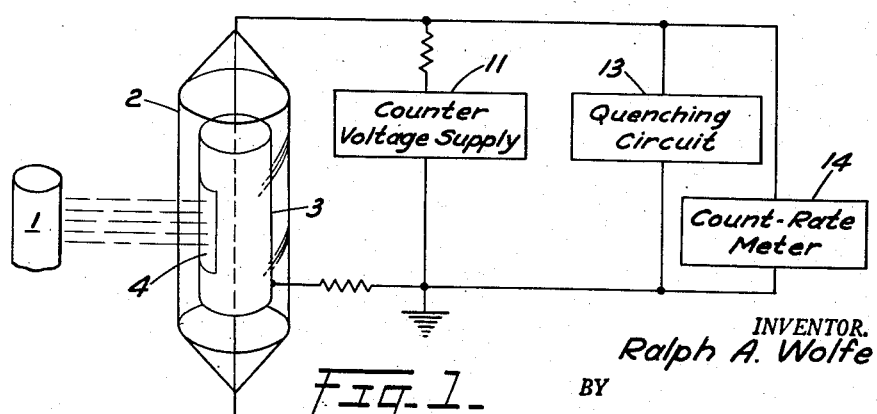
Fig-1-
INVENTOR.
Ralph A. Wolfe
BY
Roland O. Anderson
ATTORNEY

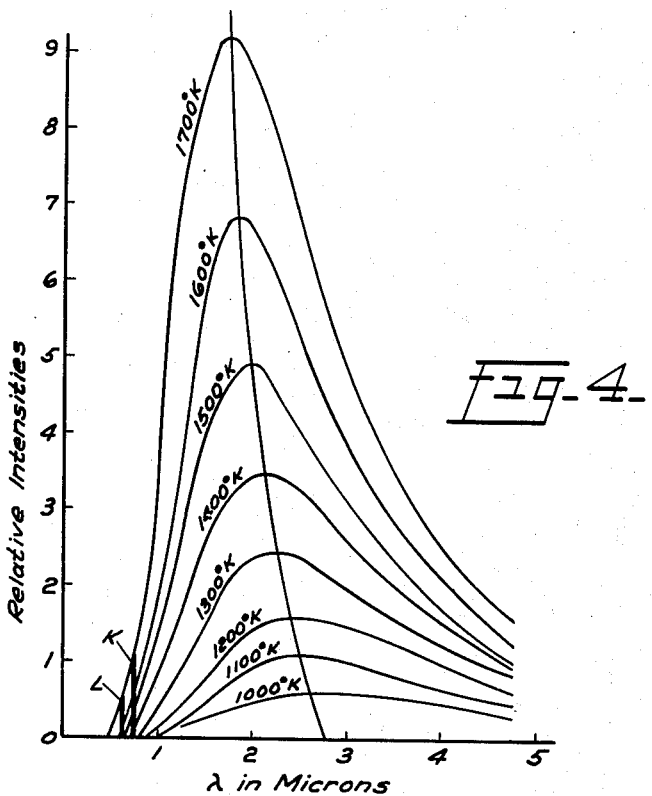
Fig-4-
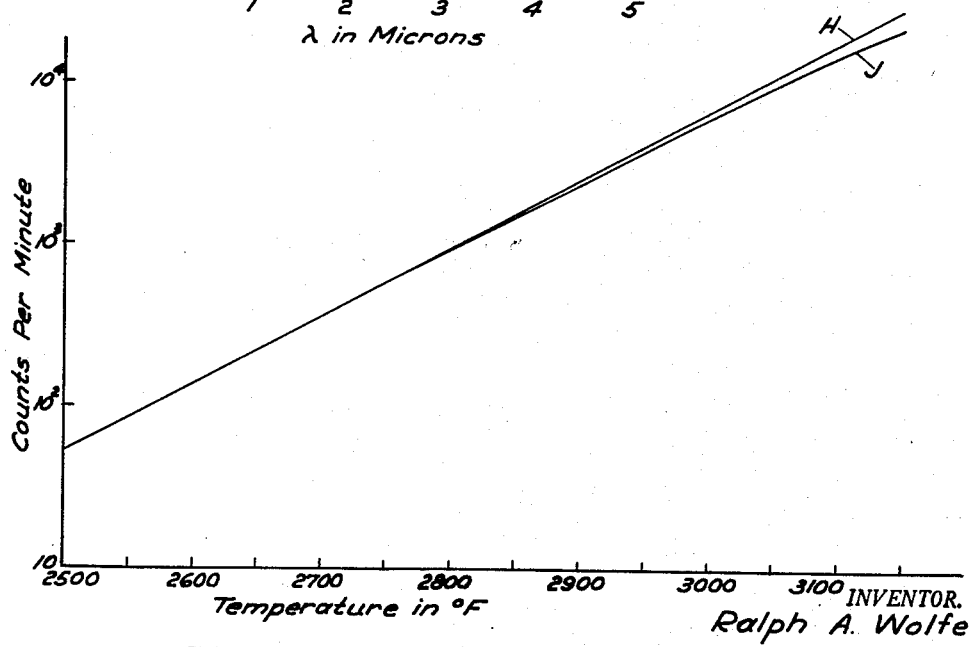
Fig-5-
INVENTOR.
Ralph A. Wolfe
BY
Roland A. Anderson
ATTORNEY

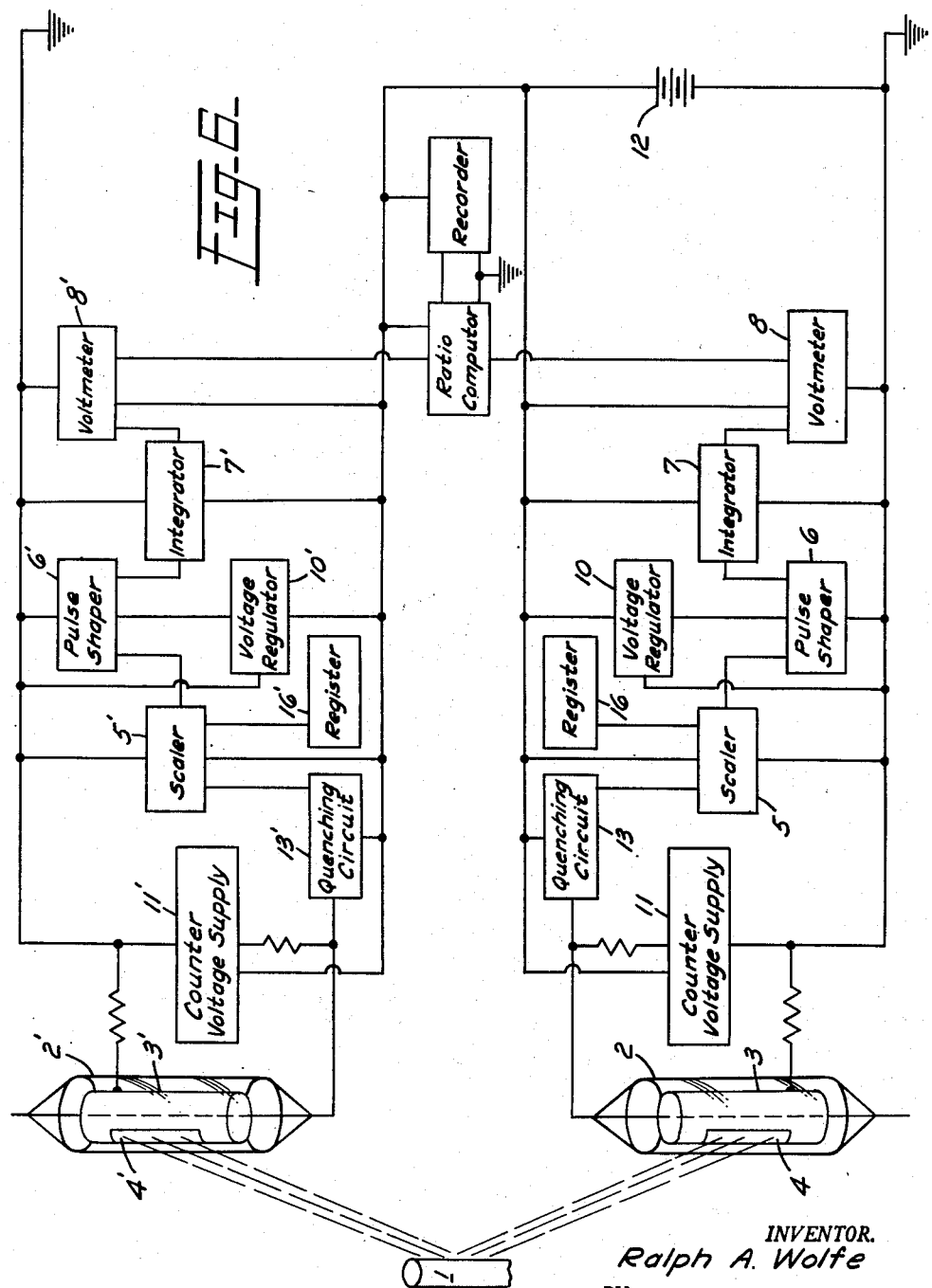

United States Patent Office 2,695,364
Patented Nov. 23, 1954

2,695,364
PYROMETER

Ralph A. Wolfe, Ann Arbor, Mich., assignor to the United States of America as represented by the United States Atomic Energy Commission Application June 22, 1951, Serial No. 233,022

5 Claims. (Cl. 250—83.6)

The present invention relates to pyrometry, and more especially to a novel method of and apparatus for measuring elevated temperatures over a wide range.

In measuring exceedingly high temperatures above 1200° C., presently employed means such as optical pyrometers are generally very expensive, and thermocouples may be short-lived and not sufficiently accurate for general usage. Accordingly, it is a primary object of the present invention to provide a novel, relatively simple, and inexpensive method and apparatus for measuring very high temperatures.

A further object of the invention is to provide a method of and apparatus for accurate and reliable measurement of temperature.

Yet another object of the invention is to provide a method of and apparatus for measuring temperature which may be employed in daylight without inaccuracy.

These and other objects of the invention are achieved by monitoring the energy emitted by the object the temperature of which is to be measured with certain familiar radioactive radiation detectors, such as Geiger-Müller counters. I have discovered that, by means of these detectors and associated electrical counting equipment, I can detect and measure changes in temperature by detecting and measuring a shift in both the energy distribution of that radiation and the maximum energy value occurring within that spectrum.

The novel method and apparatus I have devised for measuring temperature may best be understood from the following detailed description of a preferred embodiment thereof, when read in connection with the appended drawings, in which:

Fig. 1 illustrates schematically one embodiment of the invention disposed adjacent the source of temperature to be measured, Fig. 2 shows graphically the calculated relation between counting rate of an ideal detector and the radiation spectra of black bodies at several different temperatures, Fig. 3 illustrates schematically a preferred form of the electronic circuits which may be associated with the detector of Fig. 1 to derive temperature measurements therefrom.

Fig. 4 illustrates the relation between the intensity of radiation emitted and its wave-length. Fig. 5 shows a sample calibration curve of a preferred form of my invention, and Fig. 6 illustrates schematically two detectors exposed to the same source, together with their associated circuits, for measuring temperature in accordance with the teachings of my invention.

Referring now to Fig. 1, the temperature source is shown as a rod 1 for simplicity. At a known distance from the source is disposed gas-filled detector 2, energized by potential source 11 and connected to a discharge-quenching circuit 13 and a count-rate meter 14, for determining the rate of occurrence of gaseous discharges in the detector caused by photons from the source. To allow radiation from the source 1 to strike the inner wall of the tubular cathode 3, an aperture or window 4 may be cut in the wall, and that window is turned toward the source during operation of the device. The materials from which the cathode and envelope are constructed are important, in that they will limit the operation of the detector to a definite range of temperatures, for reasons which will be discussed more fully hereinafter. A nickel cathode in a quartz envelope has been found to give very satisfactory results, but, as will be apparent from the following discussion, other materials such as copper, brass, and silver may be substituted for the nickel cathode, and other envelopes having relatively low stopping power for photons may be employed with a corresponding change in calibration of the instrument. The center wire of the detector may be tungsten, nickel, or other conductive materials well-known to the radioactive radiation counting art, and the tube may be filled with hydrogen at 10 centimeters pressure, argon, or any conventional radiation counter-filling gas. A non-self-quenching filling gas is preferred, because of its greater life and stability, where long-time temperature measurements are to be made. The quenching circuit 13 rapidly suppresses the avalanche in the detector so that substantially all the incoming photons may be counted.

Referring now to Fig. 2, curve A shows the experimentally-determined relationship between the counting rate of a Geiger tube-type detector having a nickel cathode and the energy of light quanta incident upon it. Curve B illustrates the spectral distribution of energy radiated from a black body at 1000° C., as predicted from Wien's law:

$$R_\lambda = \frac{C_1 \lambda^{-5}}{e^{\frac{C_2}{\lambda T}}}$$

where $R$ is the radiancy at wave-length $\lambda$ of the black body,
$C_1$ is a constant determined by the experimental arrangement,
$\lambda$ is the wave-length of the radiation,
$C_2$ is a constant, 14,320 $\mu°$ K., and
$T$ is the absolute temperature of the body.

Curves C–G illustrate the calculated response of the above Geiger tube detector to the radiation from a black body at six different temperatures, as determined from curves A and B. Although a different scale factor has been used for these curves to accent the relative differences in response at different temperatures, it may be appreciated from inspection of the curves that the counting rate of a detector to energy emitted in a narrow spectral region between $V_1$ and $V_2$ will change as the temperature of the source changes, due to the shift in the spectral distribution of the emitted energy. For the detector referred to above, values of $\lambda_1$ and $\lambda_2$ are .18 micron and .27 micron respectively. The shaded areas under the distribution curves, F, G, show how the response of a detector might change as the source temperature varies from 1800° C., to 2000° C., the detector being sensitive to radiation.

Referring now to Fig. 3, a more complete instrument for measuring and recording temperature is illustrated. Detector 2, energized from power supply 11, is connected to circuit 13, a conventional Neher-Harper type quenching circuit. Power source 12 may furnish energy for operation of the electronic components of the instrument, including counter voltage supply 11. Pulses from the detector may be fed to a conventional scaling circuit 5, the output of which may be used to trip a mechanical register 16 of the usual type and/or may be sent to a pulse shaping circuit 6, which is followed by integrating circuit 7. The integrator may be the well-known "count-rate meter" circuit, which develops a voltage proportional to the rate of receipt of pulses from the scaler. That voltage, therefore, is a function of the counting rate of the detector and hence is a measure of the energy emitted within certain wave-lengths by the source which irradiates the detector. A conventional vacuum-tube voltmeter 8 may be employed to measure that voltage, and a recorder 9, such as a Leeds and Northrup "Micromax," calibrated to indicate temperature, may be connected to the voltmeter in the conventional manner to record the voltage. Voltage regulator 10 may be provided to maintain a constant plate supply for the pulse shaper 6, so that the amount of charge fed to the integrator 7 by each output pulse from circuit 6 will not vary from pulse to pulse.

All of the circuits shown are of conventional design. It is apparent that many other suitable electronic circuits could be designed to accomplish the desired function of determining and indicating the number of gaseous discharges per unit time without departing from the spirit of the present invention.

In calibrating the present device, the source 1 may be heated to a known temperature as determined by an optical pyrometer, and the counter 2 may be placed in a predetermined position adjacent thereto. Photons from the source enter the window 4 and impinge on cathode 3, initiating a series of gaseous discharges within the detector, which are quenched by the electronic circuit 14. Each discharge actuates the scaling circuit 5, the output pulses of which are employed to trigger the single-shot multivibrator pulse shaper 6. By this arrangement, each scaler output pulse causes the multivibrator to deposit a given amount of energy into a capacitor in the integrating circuit 7. The average potential of the capacitor appears on the meter of voltmeter 8 and the chart of recorder 9, and these particular points are marked. Then the temperature of source 1 is changed, and new points on the meter and chart are established. By thus proceeding for several known temperatures, the chart and/or meter scale may be calibrated over any temperature range desired.

Figure 5 illustrates the response of such an instrument to radiations from an electric furnace in the temperature range 2500°–3000° Farenheit. Curve J shows how the actual number of pulses received by scaler 5 above varies with temperature, while curve H is a calculated response curve representing the ideal linear-logarithmic response of the counter 2 above if no losses were present in the quenching circuit. It is apparent that the instrument could be employed in an automatic temperature controller for a furnace, using the voltage from integrator 7 as the control voltage to regulate flow of current to the windings of an induction furnace, for example.

I have found the accuracy of the above-described measurements at 1250° C., to be within ±6°, and at 1525° C., to be within ±1°. No upper limit of the temperature range of my invention is foreseen, while the lower limit is determined by the threshold wavelength of the detector tube cathode employed. For a nickel cathode, this wavelength is about 2650 Ångstrom units, while for copper, it is 3000 Ångstroms. Since all light in the visible spectrum is characterized by wavelength of 4000–8000 Ångstroms, counter tubes of nickel and copper will be unaffected by such light, and the apparatus may be used in daylight without the necessity of recalibration or correcting for a background count. It is apparent that for temperatures lower than those measurable with nickel cathodes, about 1250° C., other materials having a higher threshold wavelength, such as copper or silver, may be employed.

Referring now to Figure 6, the apparatus described herein may be adapted to the two-color method of heat measurement as well as to the monochromatic method heretofore described. The two-color method has decided advantages over the simpler method; it does not depend on the emittance of the body radiating, or upon the space intervening between source and detector where radiation losses occur, and it needs no external calibration. The difference in the relative change of counting rates of two detectors per degree change in temperature forms a basis for this apparatus. As may be seen from Figure 4, the relative intensity of the radiation of any given wave-length from a radiating sources varies with temperature, and the waves of maximum intensity become shorter as the temperature increases. Therefore two detectors, sensitive only over very limited, but different, regions, will produce different counting rates for a given temperature. The shaded areas K and L illustrate the relative magnitudes of these counting rates. Because of the shift in maxima, the curves are not uniform in slope; therefore a change in source temperature will cause the two counting rates to change by different amounts. This effect may be accentuated by comparing the relative change in the two counting rates per degree change in temperature. Therefore if two systems such as I have proposed are together exposed to a source, and the output voltages are fed from voltmeter 8, Figure 3, to a comparing device for computing their ratio, an output signal may be derived which is proportional to absolute temperature of the source.

It is evident that I have provided new and novel means for measuring temperature particularly adapted to high temperature work; that is, temperatures above several hundred degrees centigrade. Since my novel apparatus provides an output voltage which varies logarithmically with temperature, it will be apparent that I have provided the basis for a simple method of temperature control, especially control of electric furnaces, heaters, and the like.

What is claimed is:

1. In combination, first and second Geiger-Müller type radiation detectors each including a metallic cathode, said cathodes being characterized by different work functions; means for exposing said cathodes to the radiations emitted by the body, the temperature of which is to be determined; means for deriving first and second voltages proportional to the rate of occurrence of Geiger discharges within said detectors, and means for deriving a third voltage proportional to the ratio of said first and second voltages, said third voltage being proportional to said temperature.

2. A method of measuring the temperature of a substance comprising the steps of exposing to the radiations emitted from said substance a calibrated Geiger-Müller counter, and determining and indicating the rate of occurrence of pulses produced by said counter responsive to said radiations, said rate of occurrence being directly proportional to the temperature of said substance.

3. The method of measuring the temperature of a substance comprising the steps of exposing an apertured Geiger-Müller counter to said substance, and counting the rate of occurrence of discharges of said counter, said rate being directly proportional to the temperature of said substance.

4. The method of measuring temperature of a substance comprising the steps of exposing to the radiations emitted from said substance an apertured Geiger-Müller counter, counting the rate of occurrence of discharge of said counter responsive to said radiations, and deriving an electrical signal proportionate to said counting rate, the magnitude of said signal being directly proportional to said temperature.

5. The method of measuring the temperature of a substance comprising the steps of exposing a pair of apertured Geiger-Müller counters characterized by the different work-functions of their cathodes to the radiations emitted by said substance, counting the rate of occurrence of discharges of said counters, and deriving an electrical signal proportional to the ratio of said counting rates, the magnitude of said signal being directly proportional to said temperature.

References Cited in the file of this patent

UNITED STATES PATENTS

| Number | Name | Date |
|---|---|---|
| 2,465,821 | Smoluchowski | Mar. 29, 1949 |

OTHER REFERENCES

"Electronic Fire and Flame Detector" by Paul B. Weisz from "Electronics," July 1946, pp. 106–109.

"A New Quenching Circuit for Geiger Counters," by H. Maier Leibnitz, from "The Review of Scientific Instruments," Aug. 1948, vol. 19, No. 8, pp. 500 to 503.

Photoelectric Quantum Counters for Visible and Ultraviolet Light, by Gordon L. Locher from Physical Review, vol. 42, Nov. 15, 1932, pp. 525–546.